US010875741B2

(12) United States Patent
Scoville et al.

(10) Patent No.: US 10,875,741 B2
(45) Date of Patent: Dec. 29, 2020

(54) ELEVATOR REQUEST AUTHORIZATION SYSTEM FOR A THIRD PARTY

(71) Applicant: OTIS ELEVATOR COMPANY, Farmington, CT (US)

(72) Inventors: Bradley Armand Scoville, Farmington, CT (US); Yew Leong, Simsbury, CT (US); Adam Kuenzi, Silverton, OR (US); Cesar Aguilar, Brooklyn, NY (US); Simantov Yousoufov, Queens, NY (US); Yuri Novozhenets, Pittsford, NY (US); Jason Higley, Pittsford, NY (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 382 days.

(21) Appl. No.: 15/721,360

(22) Filed: Sep. 29, 2017

(65) Prior Publication Data

US 2019/0100405 A1 Apr. 4, 2019

(51) Int. Cl.

| | |
|---|---|
| ***B66B 13/00*** | (2006.01) |
| ***H04W 12/06*** | (2009.01) |
| ***B66B 1/34*** | (2006.01) |
| ***B66B 1/46*** | (2006.01) |

(52) U.S. Cl.

CPC .......... *B66B 1/3415* (2013.01); *B66B 1/3453* (2013.01); *B66B 1/468* (2013.01); *B66B 2201/4615* (2013.01); *B66B 2201/4653* (2013.01); *B66B 2201/4661* (2013.01); *B66B 2201/4676* (2013.01)

(58) Field of Classification Search

USPC .......................................................... 187/384

See application file for complete search history.

(56) References Cited

U.S. PATENT DOCUMENTS

| | | | |
|---|---|---|---|
| 6,869,014 | B2 | 3/2005 | Gerstenkorn |
| 7,012,503 | B2 | 3/2006 | Nielsen |
| 7,145,433 | B2 | 12/2006 | Gerstenkorn |

(Continued)

FOREIGN PATENT DOCUMENTS

| | | | |
|---|---|---|---|
| CN | 101844713 | A | 9/2010 |
| CN | 103771211 | A | 5/2014 |

(Continued)

OTHER PUBLICATIONS

Search Report dated May 8, 2019 in U321003EP, EP Application No. 18197681.2, 22 pages.

Anonymous, “Kone RemoteCall”, KONE, Jan. 27, 2015, 2 pages.

*Primary Examiner* — Christopher Uhlir

(74) *Attorney, Agent, or Firm* — Cantor Colburn LLP

(57) ABSTRACT

An elevator request authorization system is provided and includes a second server configured to grant an elevator use token upon request from a first server registerable with the second server for establishing secure communications between the second server and the first server. The first server is configured to be receptive of an elevator request relating to elevator usage by a user, to authenticate the user, to authorize the elevator usage by the user to which the elevator request relates, to request the elevator use token from the second server via the secure communications upon authentication and authorization and to deliver the elevator use token to the user upon receipt.

20 Claims, 2 Drawing Sheets

(56) References Cited

U.S. PATENT DOCUMENTS

| | | | |
|---|---|---|---|
| 7,620,817 | B2 | 11/2009 | Friedli et al. |
| 7,664,464 | B2 | 2/2010 | Gerstenkorn |
| 7,706,778 | B2 | 4/2010 | Lowe |
| 7,717,238 | B2 | 5/2010 | Hamaji et al. |
| 7,886,336 | B2 | 2/2011 | Schuster et al. |
| 8,401,472 | B2 | 3/2013 | Gerstenkorn |
| 8,485,317 | B2 | 7/2013 | Gerstenkorn et al. |
| 8,770,350 | B2 | 7/2014 | Wilke et al. |
| 8,813,917 | B2 | 8/2014 | Salmikuukka et al. |
| 8,819,792 | B2 | 8/2014 | Adams |
| 8,820,486 | B2 | 9/2014 | Gerstenkorn et al. |
| 9,082,244 | B2 | 7/2015 | Gerstenkorn |
| 9,463,954 | B2 | 10/2016 | Kumar et al. |
| 9,659,422 | B2 | 5/2017 | Lovelock et al. |
| 2006/0170533 | A1* | 8/2006 | Chioiu .................... G07C 9/27 340/5.61 |
| 2010/0321150 | A1 | 12/2010 | Lee et al. |
| 2012/0068818 | A1 | 3/2012 | Mizon |
| 2015/0201329 | A1* | 7/2015 | Daigle .................. H04W 48/08 705/67 |
| 2015/0254915 | A1* | 9/2015 | Lovelock .......... H04W 12/0802 340/5.54 |
| 2016/0009525 | A1 | 1/2016 | DePaola et al. |
| 2016/0035160 | A1 | 2/2016 | Friedli |
| 2016/0221791 | A1 | 8/2016 | Berryhill |
| 2016/0264377 | A1 | 9/2016 | Beloin et al. |
| 2017/0190543 | A1 | 7/2017 | Friedli |
| 2017/0243417 | A1 | 8/2017 | Shila et al. |
| 2019/0097794 | A1* | 3/2019 | Nix ....................... H04L 63/123 |
| 2019/0312737 | A1* | 10/2019 | Mani .................. H04L 63/0807 |
| 2020/0235923 | A1* | 7/2020 | Nix .................... H04W 40/005 |

FOREIGN PATENT DOCUMENTS

| | | | |
|---|---|---|---|
| CN | 105438900 | A | 3/2016 |
| CN | 104340780 | B | 4/2016 |
| CN | 106006241 | A | 10/2016 |
| DE | 10147936 | A1 | 4/2003 |
| EP | 2085934 | A1 | 8/2009 |
| JP | 2007223733 | A | 9/2007 |
| WO | 2016012653 | A1 | 1/2016 |
| WO | 2016096803 | A1 | 6/2016 |
| WO | 2017041823 | A1 | 3/2017 |

* cited by examiner

ELEVATOR REQUEST AUTHORIZATION SYSTEM FOR A THIRD PARTY

BACKGROUND

The following description relates to elevator systems and, more specifically, to a mobile elevator request floor authorization system of an elevator system for a third party.

In the fields of physical security and information security, access control (AC) is the selective restriction of access to a place or other resource. The act of accessing may mean consuming, entering or using. Permission to access a resource is called authorization.

In a building, AC is employed to permit or prevent access to certain areas or floors by various personnel. For example, in a hotel, hotel guests may be permitted to have access to their guestrooms and public areas but not to other guestrooms or hotel offices. On the other hand, cleaning services may have access to all the guestrooms.

In any case, movement between floors in a building is often provided by way of an elevator system that is responsive to elevator requests made in elevator bays. Those elevator requests may be improper, however, as in a case in which a hotel guest or cleaning person requests travel to a floor in the hotel to which he does not have access.

BRIEF DESCRIPTION

According to an aspect of the disclosure, an elevator request authorization system is provided and includes a second server configured to grant an elevator use token upon request from a first server registerable with the second server for establishing secure communications between the second server and the first server. The first server is configured to be receptive of an elevator request relating to elevator usage by a user, to authenticate the user, to authorize the elevator usage by the user to which the elevator request relates, to request the elevator use token from the second server via the secure communications upon authentication and authorization and to deliver the elevator use token to the user upon receipt.

In accordance with additional or alternative embodiments, the elevator request is initiated via a mobile device.

In accordance with additional or alternative embodiments, the first server has an administration key for supporting the secure communications. The administration key is receivable from the second server upon registration of the first server.

In accordance with additional or alternative embodiments, the elevator request includes user identification information and source and destination floor identification.

In accordance with additional or alternative embodiments, authentication and authorization by the first server include confirmation of user validity and confirmation of elevator request permissibility, respectively.

According to another aspect of the disclosure, an elevator request authorization system is provided and includes an elevator system including at least one elevator servicing a plurality of floors in a building and a second server configured to grant an elevator use token upon request from a first server registerable with the second server as a trusted entity for establishing secure communications between the second server and the first server. The first server is configured to be receptive of an elevator request relating to elevator usage by a user, to authenticate the user, to authorize the elevator usage by the user to which the elevator request relates, to request the elevator use token from the second server via the secure communications upon authentication and authorization and to deliver the elevator use token to the user upon receipt. The elevator system is receptive of the elevator use token from the user and configured to issue to the user a notification responsive to elevator use token reception.

In accordance with additional or alternative embodiments, the user initiates the elevator request with a mobile device.

In accordance with additional or alternative embodiments, the first server has an administration key for supporting the secure communications. The administration key is receivable from the second server upon registration.

In accordance with additional or alternative embodiments, the elevator request includes user identification information and source and destination floor identification.

In accordance with additional or alternative embodiments, authentication and authorization by the first server include confirmation of user validity and confirmation of elevator request permissibility, respectively.

In accordance with additional or alternative embodiments, the notification includes at least one of elevator assignment, position and arrival information.

In accordance with additional or alternative embodiments, the elevator use token includes at least one of a one-time elevator use token and an elevator use token that is valid for a predefined number of elevator usages.

In accordance with additional or alternative embodiments, the elevator use token is valid for a predefined sequence of elevator usages.

In accordance with additional or alternative embodiments, the elevator use token includes at least one of a temporarily valid elevator use token and an elevator use token that is valid at certain times.

According to yet another aspect of the disclosure, a method of executing elevator request authorization is provided and includes registering a first server with a second server to establish secure communications between the second server and the first server, receiving, at the first server, an elevator request relating to elevator usage by a user, authenticating and authorizing, at the first server, the user and the elevator usage by the user to which the elevator request relates, respectively, requesting via the secure communications, by the first server, an elevator use token from the second server upon the authenticating and authorizing and issuing, by the second server, the elevator use token to the first server responsive to the requesting.

In accordance with additional or alternative embodiments, the method further includes generating the elevator use token to include a one-time elevator use token.

In accordance with additional or alternative embodiments, the method further includes generating the elevator use token to include a temporarily valid elevator use token.

In accordance with additional or alternative embodiments, the method further includes generating the elevator use token to include an elevator use token which is valid at certain times.

In accordance with additional or alternative embodiments, the method further includes generating the elevator use token to be valid for a predefined number of elevator usages.

In accordance with additional or alternative embodiments, the method further includes generating the elevator use token to be valid for a predefined sequence of elevator usages.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, a method for authorizing elevator requests to specific floors is provided. An administration key is issued to a trusted third party enabling the trusted third party to request elevator use tokens for certain users. One such user then places an elevator request to the trusted third party and the trusted third party authenticates the user (i.e., by making sure the user is himself trusted, authentic or pre-registered with the trusted third party), inspects the elevator request, and determines if the user is authorized to use a corresponding elevator system in accordance with the elevator request. Authorization logic is thus the responsibility of the trusted third party and it is expected that the trusted third party will inspect, for example, the source floor and the destination floor as part of the authorization. Once the trusted third party has authenticated and authorized the user, the trusted third party requests the elevator use token over a secured link to the elevator server, the elevator server responds by issuing such elevator use token, and the trusted third party provides the elevator use token to the user. The user then uses the elevator use token to make an elevator request to the elevator server.

Figure 1:
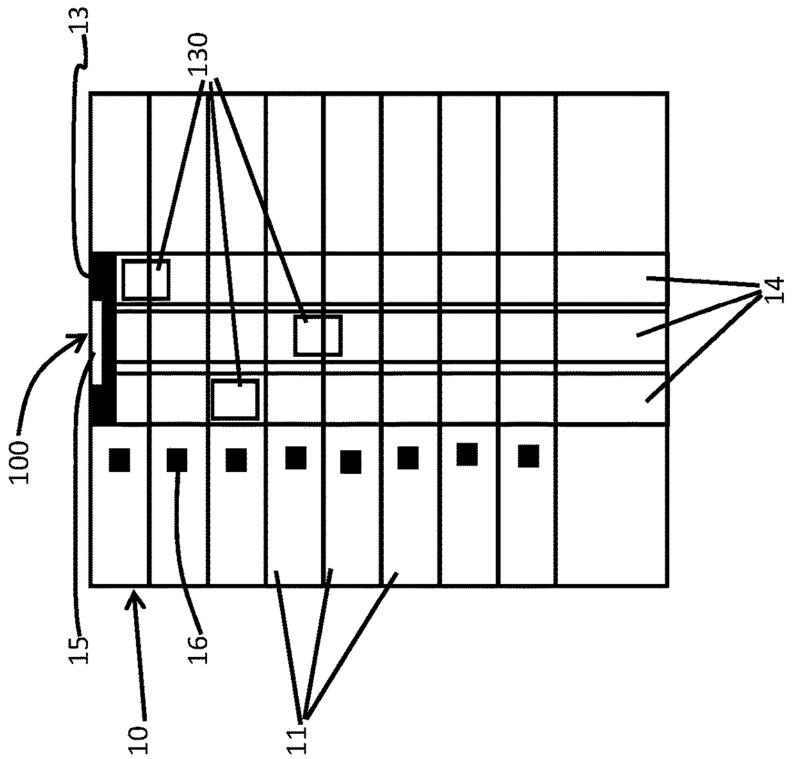
FIG. 1 is a schematic illustration of a building in accordance with embodiments.

With reference to FIG. 1, a building 10 is provided. The building 10 may be a hotel, an office building, an apartment building or any other type of building and includes a plurality of floors 11 and an access control system 100. The access control system 100 is generally configured to prevent or permit access to areas in the building 10 and includes or communicates with an elevator system 13. The elevator system 13 includes one or more elevator cars 130 that travel through hoistways 14 to service the plurality of the floors 11 and a dispatcher unit 15. The dispatcher unit 15 is configured to dispatch the one or more elevator cars 130 in response to elevator requests. The elevator requests may be generated at each of the plurality of floors 11 by users placing an RFID card or other secure identification in front of readers 16 that are distributed throughout the building 10 or by way of mobile devices as will be described below and then entering an elevator request into a keyboard, keypad or kiosk associated with the nearby reader 16.

Figure 2:
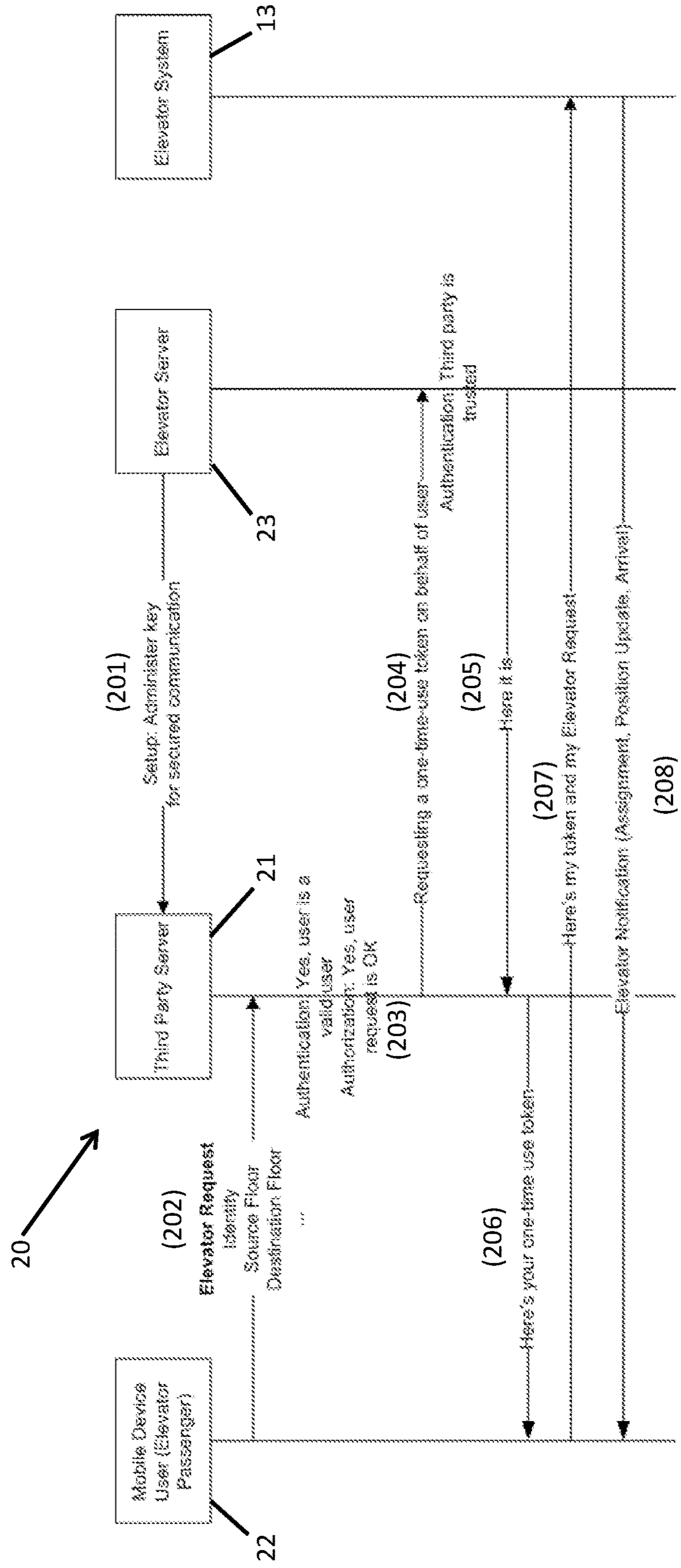
FIG. 2 is a schematic diagram illustrating an elevator request authorization system of the building of FIG. 1 in accordance with embodiments.

With continued reference to FIG. 1 and with additional reference to FIG. 2, the elevator system 13 is deployed in concert with an elevator request authorization system 20 that authorizes elevator requests to certain or specific floors. The elevator request authorization system 20 includes a remote, third party, trusted third party or first server (hereinafter referred to as a "first server") 21, which may be but is not required to be remote from the building 10 and which is accessible by a mobile or portable computing device (hereinafter referred to as a "mobile device") 22 of the user and an elevator or second server (hereinafter referred to as a "second server") 23 that may be remote from or local to the building 10.

The mobile device 22 of the user may be provided as a smartphone, a tablet, a laptop computer, a smart watch, etc. In any case, the mobile device 22 may have an application, such as an elevator request application, stored thereon for facilitating an interface between the user and the elevator system 13 and the elevator request authorization system 20 of the building 10. The user initially uses the application to register himself and the mobile device 22 with the first server 21. For purposes of clarity and brevity, the following description will relate to the case of the mobile device 22 being a smartphone.

The second server 23 is configured to grant an elevator use token upon request. In accordance with embodiments, the elevator use token may be provided as a hard-to-guess identifier that is used in a matching operation against the request. In an exemplary case, the elevator use token may be provided as a globally unique identifier (GUID), a really big number or a digital certificate including an elevator request and any restrictions about the elevator request so that the elevator system 13 can simply use the certificate to determine the limitations associated with the elevator request.

The first server 21 is registerable with the second server 23 as a trusted entity for establishing secure communications between the second server 23 and the first server 21. Such registration may be conducted prior to the registration of the user with the first server 21 and, if successful, results in the second server 23 issuing an administration key to the first server 21. The administration key could be an encryption key, a digital certificate that is used to validate any hypertext transfer protocol within a connection encrypted by transport layer security (HTTPS) request going from the first server 21 to the second server 23, a token that is included with an application programming interface (API) call to the second server 23 or any other such method of authenticating and validating that a client is trusted by a service. The administration key is subsequently held by the first server 21 and is operable for establishing and supporting secure communications between the first server 21 and the second server 23.

The first server 21 is configured to be receptive of an elevator request relating to usage of the elevator cars 130. This elevator request may be initiated by a user through the application of the mobile device 22 and may include user identification information and source and destination floor identification. The first server 21 is also configured to authenticate the user by confirmation of user validity (i.e., by making sure the user is himself trusted, authentic or pre-registered with the first server 21 via a user name and password, a self-registration mechanism by receipt of an email with a confirmation link that when clicked activates a mobile application with a token that provides for a connection to the first server 21, or by other well-known processes of validating a user account on a mobile application with the first server 21.) and to inspect and review the elevator request to determine by confirmation of elevator request permissibility whether the elevator request can be authorized for the user (i.e., by determining whether the user is authorized or permitted to travel by elevator from the source floor to the destination floor of or as identified in the elevator request). To this end, the first server 21 will maintain a logic and a database that can be used to check against which floors the user is permitted access to. Such logic and database may be unique on a building-to-building basis.

The first server 21 is further configured to either authorize the usage of the elevator cars 130 by the user to which the elevator request relates or to refuse such authorization in accordance with a result of the inspection and review. That is, the first server 21 may authorize the usage of the elevator cars 130 by the user to which the elevator request relates in an event the usage is consistent with access rights of the user as determined by the first server 21. On the other hand, the first server 21 may refuse such authorization in event the usage is inconsistent with the access rights of the user as determined by the first server 21. In addition, the first server 21 is configured to request the elevator use token from the second server 23 upon completion and affirmation of the authentication and authorization processes via the secure communications established between the second server 23 and the first server 21. As yet another feature, the first server 21 is configured to deliver the elevator use token to the user upon receipt of the elevator use token from the second server 23.

The elevator system 13 is then receptive of the elevator use token from the user and is configured to respond to the user accordingly. The response of the elevator system 13 may include issuance of a notification to the user in response to elevator use token reception. The notification may include at least one of elevator assignment, position and arrival information.

In accordance with embodiments, the elevator use token may be a one-time elevator use token. As such, in a case in which the first server 21 is operated by a cleaning service of a hotel and the user is an employee of the cleaning service, for example, the user/cleaning service employee may be able to obtain the elevator use token to move from a source floor to only a single destination floor in the hotel in an elevator car 130. If the user/cleaning service employee wishes to move from that destination floor to a second destination floor, it would be necessary for him to obtain a new elevator use token by way of a secondary elevator request in which the original destination floor is re-defined as a source floor and the second destination floor is defined as a destination floor.

In accordance with additional or alternative embodiments, the elevator use token may be valid for a predefined number of sequential or intermittent elevator usages. As such, in the example given above, the user/cleaning service employee could move from the first floor to the second floor, from the second floor to the third floor, from the third floor to the seventh floor, etc., using the same elevator use token valid for the predefined number of sequential or intermittent elevator usages as long as he did not exceed that predefined number.

In accordance with additional or alternative embodiments, the elevator use token may be valid for one or more predefined sequences of elevator usages. As such, in the example given above, the user/cleaning service employee could move from the first floor to the second floor, from the second floor to the third floor, from the third floor to the fourth floor, etc., using the same elevator use token valid for the one or more predefined sequences of elevator usages. He could not use this token, however, for moving from the first floor to an out-of-sequence floor and would need to obtain a new elevator use token to do so.

In accordance with additional or alternative embodiments, the elevator use token may be temporarily valid for a predefined period of time or to be valid only during certain times (e.g., for five minutes from a time of the issuance of the elevator use token or from 9:00 AM to 10:00 AM on one or more days). As such, in the example given above, the user/cleaning service employee could move between any pair of floors using the same elevator use token being valid for the predefined period of time. He could not use this token, however, once the predefined period of time expires and would need to obtain a new elevator use token once expiration occurs.

Figure 3:
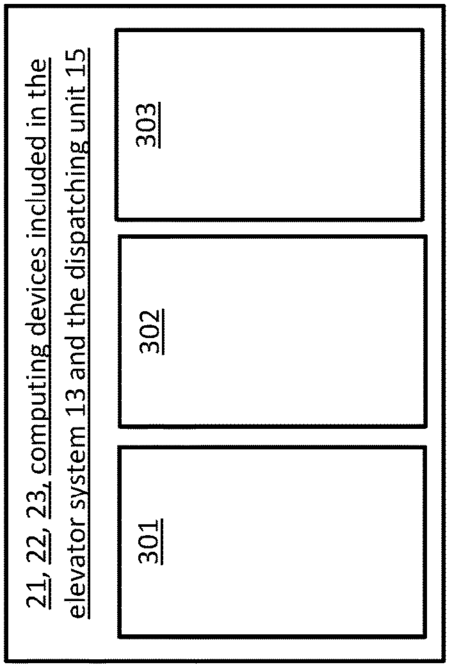
FIG. 3 is a schematic diagram of a computing device of the elevator request authorization system of FIG. 2 in accordance with embodiments.

With reference to FIG. 3, each computing device described herein (e.g., the mobile device 22, the first server 21, the second server 23 and any computing devices included in the elevator system 13 and the dispatching unit 15) may generally include a central processing unit 301, a memory unit 302 and a networking unit 303 by which the central processing unit 301 of each computing device communicates with other computing devices. The memory unit 302 has executable instructions stored thereon and which are executable by the central processing unit 301 to execute various methods, processes and algorithms. At least some of these method, processes and algorithms are described above and below.

With reference back to FIG. 2, a method of executing elevator request authorization is provided and includes registering a first server 21 with a second server 23 as a trusted entity for establishing secure communications between the second server 23 and the first server 21 (201), receiving, at the first server 21, an elevator request relating to elevator usage by a user (202), authenticating and authorizing, at the first server, the user and the elevator usage by the user to which the elevator request relates, respectively (203), requesting via the secure communications, by the first server 21, an elevator use token from the second server 23 upon completion of the authenticating and authorizing (204), issuing, by the second server 23, the elevator use token to the first server 21 responsive to the requesting (205) and delivering or forwarding the elevator use token to the user (206). Subsequently, the method may include issuing the elevator request along with the elevator use token from the user to the elevator system 13 (207) and issuing, from the elevator system 13 to the user, a notification in response to the issuance of operation 207 (208).

In accordance with embodiments, the method may also include generating the elevator use token to include at least one of a one-time elevator use token, a timed elevator use token and a temporarily valid elevator use token and/or to be valid for at least one of a predefined number of sequential or intermittent elevator usages and one or more predefined sequences of elevator usages. The generation of the elevator use token may be executed at the second server 23 at various times including, but not limited to, the registration of the first server 21 and the request for the elevator use token by the first server 21 via the secure communications.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An elevator request authorization system, comprising:

a second server configured to grant an elevator use token upon request from a first server registerable with the second server for establishing secure communications between the second server and the first server, the first server being configured to be receptive of an elevator request relating to elevator usage by a user, to authenticate the user, to authorize the elevator usage by the user to which the elevator request relates, to request the elevator use token from the second server via the secure communications upon authentication and authorization and to deliver the elevator use token to the user upon receipt.

2. The elevator request authorization system according to claim 1, wherein the elevator request is initiated via a mobile device.

3. The elevator request authorization system according to claim 1, wherein the first server has an administration key for supporting the secure communications, the administration key being receivable from the second server upon registration of the first server.

4. The elevator request authorization system according to claim 1, wherein the elevator request comprises user identification information and source and destination floor identification.

5. The elevator request authorization system according to claim 1, wherein authentication and authorization by the first server comprise confirmation of user validity and confirmation of elevator request permissibility, respectively.

6. An elevator request authorization system, comprising:

an elevator system comprising at least one elevator servicing a plurality of floors in a building; and a second server configured to grant an elevator use token upon request from a first server registerable with the second server as a trusted entity for establishing secure communications between the second server and the first server, the first server being configured to be receptive of an elevator request relating to elevator usage by a user, to authenticate the user, to authorize the elevator usage by the user to which the elevator request relates, to request the elevator use token from the second server via the secure communications upon authentication and authorization and to deliver the elevator use token to the user upon receipt, the elevator system being receptive of the elevator use token from the user and configured to issue to the user a notification responsive to elevator use token reception.

7. The elevator request authorization system according to claim 6, further comprising a mobile device by which the user initiates the elevator request.

8. The elevator request authorization system according to claim 6, wherein the first server has an administration key for supporting the secure communications, the administration key being receivable from the second server upon registration.

9. The elevator request authorization system according to claim 6, wherein the elevator request comprises user identification information and source and destination floor identification.

10. The elevator request authorization system according to claim 6, wherein authentication and authorization by the first server comprise confirmation of user validity and confirmation of elevator request permissibility, respectively.

11. The elevator request authorization system according to claim 6, wherein the notification comprises at least one of elevator assignment, position and arrival information.

12. The elevator request authorization system according to claim 6, wherein the elevator use token comprises at least one of a one-time elevator use token and an elevator use token that is valid for a predefined number of elevator usages.

13. The elevator request authorization system according to claim 6, wherein the elevator use token is valid for a predefined sequence of elevator usages.

14. The elevator request authorization system according to claim 8, wherein the elevator use token comprises at least one of a temporarily valid elevator use token and an elevator use token that is valid at certain times.

15. A method of executing elevator request authorization, comprising:

registering a first server with a second server to establish secure communications between the second server and the first server;

receiving, at the first server, an elevator request relating to elevator usage by a user;

authenticating and authorizing, at the first server, the user and the elevator usage by the user to which the elevator request relates, respectively;

requesting via the secure communications, by the first server, an elevator use token from the second server upon the authenticating and authorizing; and issuing, by the second server, the elevator use token to the first server responsive to the requesting.

16. The method according to claim 15, further comprising generating the elevator use token to comprise a one-time elevator use token.

17. The method according to claim 15, further comprising generating the elevator use token to comprise a temporarily valid elevator use token.

18. The method according to claim 15, further comprising generating the elevator use token to comprise an elevator use token which is valid at certain times.

19. The method according to claim 15, further comprising generating the elevator use token to be valid for a predefined number of elevator usages.

20. The method according to claim 15, further comprising generating the elevator use token to be valid for a predefined sequence of elevator usages.

* * * * *